UNITED STATES PATENT OFFICE.

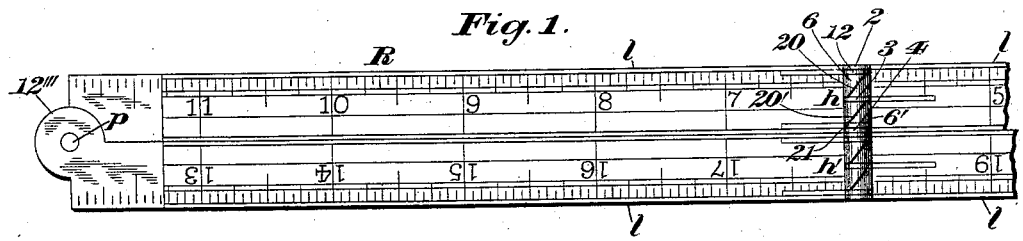

CHARLES E. RIECKER, OF NEW BRITAIN, CONNECTICUT, ASSIGNOR TO THE STANLEY RULE AND LEVEL COMPANY, OF SAME PLACE.

RULE-JOINT.

SPECIFICATION forming part of Letters Patent No. 588,294, dated August 17, 1897.

Application filed December 12, 1896. Serial No. 615,446. (No model.)

*To all whom it may concern:*

Be it known that I, CHARLES E. RIECKER, a citizen of the United States, residing in New Britain, in the county of Hartford and State of Connecticut, have invented certain new and useful Improvements in Hinge-Joints, of which the following is a specification.

This invention relates to hinge-joints, and especially to rule-joints for connecting the arms of a rule or other instrument or structure in such a manner that the connected parts will be movable in but one direction; and it has for its main object the provision of a device of this character by means of which the parts of the instrument or structure may be connected and maintained in position by a stiff joint after the journal-surfaces thereof have become worn by use.

As is well known, rule-joints are so constructed that either one or both of the complementary members of the knuckle are journaled on the pin or pintle connecting the two main members of the joint and so that the cheeks of such members will be in close bearing engagement with one another or with the cheeks of an intermediate roll or rolls and will form a tight joint; but as the cheeks of said members become worn from long use the parts of the joint swing freely about the pivot thereof and cease to hold the arms of the rule rigidly in any desired position to which they may be adjusted, and this looseness of the joint impairs the usefulness of the rule, especially when it is desired to make use of its full length for measuring purposes.

The main object of my present invention is to overcome this objection and to form a hinge-joint or rule-joint in such a manner that wear upon the members of the joint may be taken up and a close bearing engagement be maintained at all times between the cheeks thereof. I attain this end by providing the joint with an expansile knuckle member, which is in the form of a link or roll split transversely and having projections rising, respectively, from the cheeks thereof at opposite sides of the cut therein, the construction being such that when the parts are assembled and the pintle is headed up each of these projecting surfaces will be forced inward and the divided ends of the roll put under tension, thus causing them to bind firmly against the coöperating cheeks of the adjacent members of the joint not only while the joint is new and stiff, but also after said surfaces shall have become worn by long use and frequent swinging of the parts relatively to each other, excessive wear upon the joint being compensated for by reheading the pintle, and thereby bringing the sides of the split link closer together. Moreover, the size of the journal-opening in this roll will be reduced by the heading up of the ends of the pintle, as the divided ends of the roll are also brought nearer together when lateral pressure is applied thereto, thereby enabling the roll to engage the journal-surface of the pintle more firmly.

In the drawings accompanying and forming part of this specification, Figure 1 is a side elevation of a portion of a rule embodying a plurality of rule-joints constructed in accordance with my present improvements. Fig. 2 is a similar view of a portion of a rule, showing a modified construction of said rule-joints. Fig. 3 is a perspective view of another form of rule-joint for connecting the edgewise-opening arms of a rule. Fig. 4 is a longitudinal section of a portion of a rule and its joint, the section being taken in line $a\ a$, Fig. 2. Fig. 5 is a detail illustrating a transversely-split roll or washer forming a bearing member of a hinge-joint or rule-joint embodying my invention. Fig. 6 is an enlarged detail side elevation of one of the joints shown in Fig. 2 and illustrates the appearance of the roll before the pintle is headed up, and Fig. 7 is an end elevation of the same.

Similar characters designate like parts in all the figures of the drawings.

In the drawings of my present application my improved hinge-joint is applied to a folding rule (designated in a general way by R) for the purpose of connecting the several arms thereof, so that when the rule is straightened out these arms will remain in the positions in which they have been put and will not swing loosely about the pivots of the several sections of the rule. Each of the arms of the rule is designated in a general way by $l$, and, except as hereinafter specified, the rule-joints connecting such arms are substantially similar to those heretofore employed in the art.

Each of the connections between the arms of the rule is in the form of a hinge-joint, comprising a knuckle having the usual pin or pintle and two hinge-sections, one of which is guided laterally between suitable cheeks and has a journal-opening, through which the pintle is passed and on which the journal member is adapted to turn, though not freely, the friction between the sides thereof and the adjacent cheeks being sufficient to form a joint which will hold the rule-arms at any desired angle relatively to each other.

Referring first to Fig. 1, I have illustrated at $h$ and $h'$ a pair of hinge-joints or rule-joints constructed to hold the arms of the rule in the manner just described and also having my improvements embodied therein. As both of these joints are substantially identical in construction a description of one will suffice for both. The hinge $h$ embodies in this instance two hinge-sections, one of which is made up of three alined links or eyes, (designated, respectively, by 2, 3, and 4,) while the coöperating arm of the rule has extending therefrom the alined links or eyes 12 and 21, respectively, a pair of transversely-split rolls or washers being shown at 6 and 6', the sides of which are held between the cheeks of the two pairs of links 2 and 3 and 3 and 4, respectively, while said rolls and all of the links of the first-mentioned hinge-section are held and tightly clasped between the links 12 and 21. It will be noticed that each of the rolls 6 and 6' is held between a pair of members projecting, respectively, from opposite sections of the hinge-joint. The usual pin or pintle $p$ (not shown at this joint) passes through the eyes of the several links or washers, so as to form a pivot on which the parts may turn.

In Fig. 2 the several parts of the rule-joint are organized in a somewhat different manner from those represented in Fig. 1. In this second figure there is in each joint but one split link or washer, which is indicated by 6″ and bears at one side against the link 2″ of one hinge-section and at its other side against the link 21″ of the complementary hinge-section. The two links or rolls 6 and 6' are split transversely, as indicated by the oblique lines at 20 and 20', and, as hereinbefore stated, the sides or cheeks of each roll have projections rising, respectively, therefrom at opposite sides of the cut in such roll, these projections being formed in the present case by providing the rolls with spiral sides, preferably parallel, as shown in Figs. 6 and 7, the projecting portions of these spiral surfaces being pressed into close contact with the coöperating cheeks of the adjacent members of the hinge-joint when the pintle is headed up, this pintle serving as a means for holding and compressing the parts. It should be noted that this heading up of the pintle will cause the sides of the rolls to be forced inward until all points in each respective spiral surface lie in a common plane and are in contact with the adjacent cheeks of coöperating members of the joint, as shown in Figs. 1 and 2, it being obvious that as soon as the split ends of the rolls are put under tension in this manner the rolls will tend to expand and will bind firmly against the cheeks with which they are in contact and form a very stiff joint. Moreover, a considerable amount of wear upon the joint will be taken up while the joint is in use, owing to the fact that as contiguous faces wear away slightly the rolls will expand and thus prevent loosening of the joint. When the wear upon the moving parts becomes excessive after a long period of use, the pintle may be reheaded by means of a hammer or similar tool, and by the springing of the sides of the roll together the stiffness of the joint will be restored, so that the joint will be substantially as firm as when new.

In addition to the lateral hold of the spiral faces of the rolls against adjacent cheeks of the rule-joint another important result is obtained when the parts are assembled and the pintle is headed up—that is to say, the split ends of each roll are brought closer together and the journal-opening therein is reduced in size, thus causing the journal-surface thereof to bind against the pintle and aid in holding the parts so that they will turn with difficulty relatively to one another. It will be noted that this holding action will be most marked after each heading up of the pintle.

The split ends of each roll are preferably oblique to each other, this construction permitting the spiral faces of the roll to be brought into true planes and also assuring a better hold of the journal-surface of the roll upon that of the pintle to maintain it in bearing engagement with the pintle at all times.

In Fig. 3 I have illustrated my improved joint in connection with the edgewise-turning members of the rule. In this case the split member or link 6‴ is in the nature of an extension of one of the rule-arms and is of considerably greater diameter than the corresponding links or rolls shown in the other views. It is guided laterally between the opposing cheeks of the links 12‴ and 21‴ of the opposite rule-arm and is also obliquely split from its periphery to its journal-opening.

It will be obvious from the foregoing description that my improvements constitute a very simple and effective means for maintaining the stiffness of a hinge-joint and especially of a rule-joint such as is illustrated in the drawings of my present application and that the usefulness of the device will not be impaired until the spirality of the cheeks of the split link disappears, and this will not result until all the coöperating parts are practically worn out.

Having described my invention, I claim—

1. The combination, with a hinge-joint having bearing-cheeks, of a transversely-split resilient cylindrical roll or washer having normally spiral bearing-faces adapted to form, when the roll is compressed, parallel flat faces; and holding means for compressing said roll between said cheeks to bring the spiral bearing-faces thereof into parallel planes and into engagement with said cheeks to fill the space between the latter and form a closed joint.

2. The combination, with a rule-joint having the usual bearing-cheeks, of a circular transversely-split resilient washer located between said bearing-cheeks having its sides brought into parallel planes and completely closing the joint, the construction being such that said washer keeps the joint tight and takes up all wear caused by the movement of one part upon the other, substantially as and for the purpose specified.

3. A rule-joint provided with the usual pintle and bearing-cheeks, and with an expansion washer having its sides brought into parallel planes, and completely closing the part, said washer being diagonally split to form points for engaging opposing bearing-cheeks, the construction being such that when the pintle is headed up the washer is compressed and by its tendency to expand keeps the joint tight and takes up wear, substantially as and for the purpose specified.

CHARLES E. RIECKER.

Witnesses:
H. S. WALTER,
M. G. PORTER.